United States Patent Office 3,022,532
Patented Feb. 27, 1962

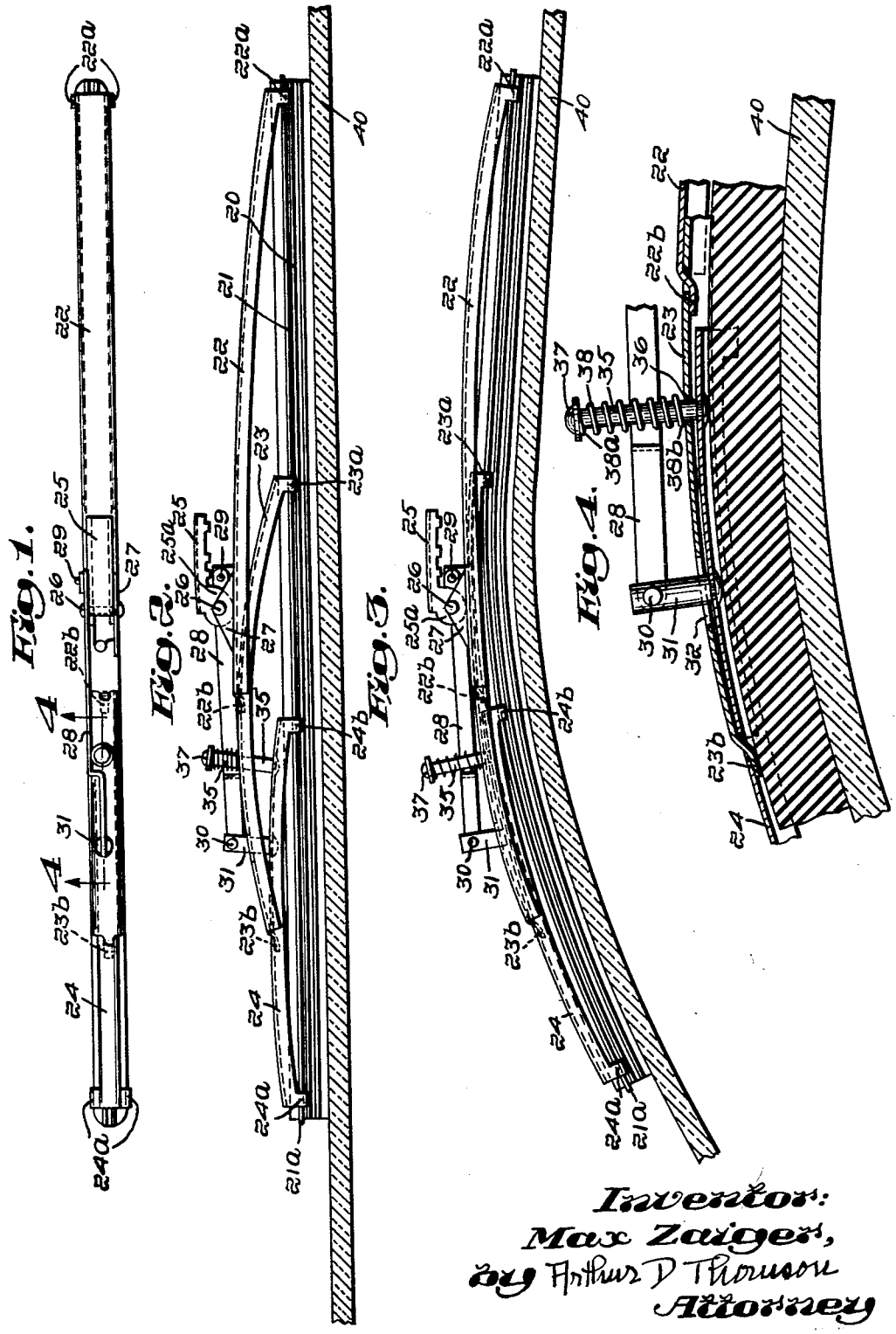

3,022,532
WINDSHIELD WIPER BLADE
Max Zaiger, 589 Essex St., Lynn, Mass.
Filed Nov. 21, 1957, Ser. No. 697,866
1 Claim. (Cl. 15—250.42)

This invention relates to windshield wiper blades and more particularly to yokes or superstructures for supporting a blade on a curved windshield.

Windshield wiper assemblies which adapt themselves to windshields having a certain amount of curvature have been in general use since curved windshields on automobiles were first introduced. The commonest types of such structures consist generally of a rubber wiper strip mounted in a flexible shell or backer, and a holder, often referred to as a yoke structure or superstructure, which engages the backer at spaced points and is connected to the wiper arm. One common type of wiper structure, known as a "triple yoke" construction, consists of a pair of yokes, called "secondary" yokes, each of which has both ends connected to the backer, and a "primary" yoke which is pivotally connected at each of its ends to the central part of one of the secondary yokes. Another type of structure, sometimes referred to as an "elbow" or "piggyback" blade, employs several yokes, all but one of which have one end connected to the backer and the other end connected to an intermediate part of the next adjacent yoke.

On a windshield of fairly uniform and large radius of curvature, the blade structures heretofore used conform well to the curvature of the surface and provide satisfactory distribution of wiping pressure along the entire blade. The introduction of the so-called "wrap around" windshield, however, has created a difficult wiping problem. These windshields have sharply swept back side portions joined to the middle portion, which is gradually curved or, in some cases, almost flat, by regions of comparatively sharp curvature. On such windshields the present blade superstructures are incapable of maintaining adequate wiping pressure and the top or outer end of the blade at this end passes around the sharply curved portion on to the side of the windshield.

One of the principal objects of this invention is to provide a blade superstructure which will maintain adequate pressure on the outer end, as well as other parts of a blade, as the blade passes over surfaces of sharp or widely varying curvature, particularly on the configurations found in wrap-around windshields. Other objects are to provide a structure which is inexpensive, durable and compact and is adaptable to either a triple yoke or an elbow type of superstructure.

In general, this invention contemplates the use of a spring which acts on the yoke of the superstructure, which is nearest the outer end of the blade, in such a manner as to bend the outer end of the blade inward when the blade is disengaged from the windshield. This pre-curving effect may be achieved by a compression spring, as described in the detailed description which follows.

In the drawings illustrating the invention:

FIG. 1 is a plan view of a windshield wiper employing one form of the invention;

FIG. 2 is a side view of the windshield wiper of FIG. 1 shown applied to a straight windshield surface;

FIG. 3 is a side view of the wiper applied to a curved windshield;

FIG. 4 is an enlarged fragmentary cross-section taken along line 4—4 of FIG. 1 but showing the wiper on a curved windshield as in FIG. 3.

The wiper blade, which is of generally conventional form, is illustrated as consisting of a rubber strip 20 having longitudinal side grooves in which a pair of flexible metal strips 21 are engaged. The superstructure shown in FIGS. 1 through 4 is of the elbow type consisting of three channel-shaped yokes 22, 23, and 24. Yoke 22 has a pair of lugs 22a which slidably engage strips 21, and a tongue 22b which is pivotally engaged in a slot in yoke 23. Yoke 23 has a pair of lugs 23a, which slidably engage strips 21, and a tongue 23b which is pivotally engaged in a slot in yoke 24. Yoke 24 has a pair of lugs 24a and 24b at both ends in sliding engagement with strips 21.

The superstructure is provided with a clip or connector, which may be of any suitable type, for attaching the blade to a windshield wiper arm. The connector here illustrated is the subject of my copending applications Serial No. 638,244, filed February 5, 1957, now Patent No. 2,932,843, and Serial No. 712,554, filed January 31, 1958, now Patent No. 2,942,288.

The channel-shaped clip 25 is adapted to receive a bayonet type of arm end, and has a cross bar 26, one end of which is journalled in a bracket 27 mounted on yoke 22 and the other end of which is journalled in a lever 28. The lever is pivoted at one end by a pin 29 to a bracket mounted on yoke 22, and at the other end by a pin 30 to a stud 31 which is attached to yoke 24 and extends through a slot 32 in yoke 23.

A post 35, which is attached to yoke 24, projects upwardly through a clearance hole 36 in yoke 23 and has a flanged head 37 at its upper end. A coil spring 38 is wound freely around post 35 with its upper coil 38a bearing on head 37 and its lower coil 38b bearing on the back of yoke 23.

Spring 38, when the blade is unstressed, will normally tilt yoke 24 to a position in which its righthand, or inner end, engages yoke 23, thus bending that end of the blade which is engaged by lugs 24a. The action of the blade on a windshield surface is illustrated in FIGS. 2 and 3, the windshield being indicated by the numeral 40. On a flat windshield the pressure on end portion 21a of the blade will cause yoke 24 to tilt against the force of spring 38 to a position in which the blade is straight. When the outer end portion of the blade engages a curved windshield surface, the pressure of spring 38 helps to conform the blade to the surface, and maintain adequate wiping pressure on the extreme end portion. Preferably the yokes are so proportioned that yoke 24 can tilt slightly further than the extreme position which it will assume when on the windshield, thus ensuring that some pressure will be applied by spring 38 at all times when the blade is in operation.

What is claimed is:

In a windshield wiper blade assembly of the type including a flexible blade, and a pressure distributing superstructure engaged with the blade at several longitudinally spaced points; said superstructure comprising a first yoke having two end portions engaged with said blade at two longitudinally spaced points, a second yoke having a pivotal connection with said first yoke intermediate said points, means for distributing pressure from said second yoke to the blade at a third point remote from the two points engaged by said first yoke, a post attached to said first yoke between said connection and that end portion which is disposed nearest said third point, said second yoke having an aperture through which said post passes freely, and a coil spring secured to said post and bearing on said second yoke, said spring being under compression and urging said last named end portion toward said second yoke.

References Cited in the file of this patent
UNITED STATES PATENTS

| | | |
|---|---|---|
| 2,706,291 | Rappl | Apr. 12, 1955 |
| 2,772,436 | Diebel | Dec. 4, 1956 |
| 2,800,676 | Makela et al. | July 30, 1957 |
| 2,807,821 | Scinta | Oct. 1, 1957 |
| 2,871,498 | Oishei et al. | Feb. 3, 1957 |
| 2,876,478 | Wallis | Mar. 10, 1959 |
| 2,888,702 | Sussex | June 2, 1959 |